(12) United States Patent
Rhodes

(10) Patent No.: US 11,030,758 B2
(45) Date of Patent: Jun. 8, 2021

(54) METHOD AND APPARATUS FOR REGISTERING IMAGES OF HISTOLOGICAL SECTIONS

(71) Applicant: 3Scan Inc., San Francsico, CA (US)

(72) Inventor: Christopher Rhodes, San Francisco, CA (US)

(73) Assignee: Strateos, Inc., San Francisco, CA (US)

( * ) Notice: Subject to any disclaimer, the term of this patent is extended or adjusted under 35 U.S.C. 154(b) by 41 days.

(21) Appl. No.: 16/416,211

(22) Filed: May 18, 2019

(65) Prior Publication Data

US 2019/0355135 A1 Nov. 21, 2019

Related U.S. Application Data

(60) Provisional application No. 62/673,676, filed on May 18, 2018.

(51) Int. Cl.
*G06K 9/00* (2006.01)
*G06T 7/37* (2017.01)
(Continued)

(52) U.S. Cl.
CPC .............. *G06T 7/37* (2017.01); *G06T 3/0068* (2013.01); *G06T 3/4084* (2013.01); *G06T 2207/10056* (2013.01); *G06T 2207/30024* (2013.01)

(58) Field of Classification Search
CPC ... G06T 3/4084; G06T 3/0068; G06T 3/0075; G06T 3/0081; G06T 3/0006; G06T 3/60; G06T 2207/10056; G06T 2207/30024; G06T 2207/30096; G06T 2207/10024; G06T 2207/20048; G06T 2207/20064; G06T 2207/30068; G06T 2207/30081; G06T 2207/30088; G06T 2207/30092; G06T 2207/30056; G06T 2207/30032; G06T 2207/30028; G06T 2207/30061; G06T 2207/20016; G06T 2207/30004; G06T 2207/10061; G06T 2200/24; G01N 1/312; G01N 21/6458; G01N 2001/368; G01N 2800/60; G06K 9/4604; G06K 9/4628; G06K 9/527; G06K 9/6269; G06K 9/00523; G06K 9/4671; G06K 9/522; G06K 9/6203; G06K 9/6205; G06K 9/6232; G06K 9/6244; G06K 9/6245; G06K 9/0014; G06K 9/00127; G06K 9/00147; G06K 9/3208; G06K 9/6201; G06K 9/3233; G06K 9/34; G06K 9/627; G06K 2209/29; G06K 2209/053; A61B 5/0013; A61B 5/0033; A61B 5/7425; A61B 5/743; A61B 5/7267;
(Continued)

(56) References Cited

U.S. PATENT DOCUMENTS

2009/0245610 A1* 10/2009 Can ..................... G01N 1/312
382/133
2011/0040169 A1* 2/2011 Kamen .................... G06T 7/33
600/411

(Continued)

*Primary Examiner* — Jose L Couso
(74) *Attorney, Agent, or Firm* — Wong & Rees LLP; Kirk D. Wong

(57) ABSTRACT

An automated tissue section slicing, staining, and imaging system efficiently registers full-resolution tissue section images by applying scaled transformation matrices computed to register downsampled tissue section images to the full-resolution tissue section images.

20 Claims, 18 Drawing Sheets

(51) Int. Cl.
*G06T 3/40* (2006.01)
*G06T 3/00* (2006.01)

(58) Field of Classification Search
CPC ... A61B 5/7257; A61B 5/726; A61B 2576/00; G16B 45/00; G16B 25/10; C12Q 1/6886; G16H 30/00; G16H 50/00
See application file for complete search history.

(56) References Cited

U.S. PATENT DOCUMENTS

| | | | |
|---|---|---|---|
| 2014/0233826 A1* | 8/2014 | Agaian | G16H 30/20 |
| | | | 382/133 |
| 2014/0267671 A1* | 9/2014 | Kenny | G06K 9/3208 |
| | | | 348/79 |
| 2017/0053398 A1* | 2/2017 | Mahoor | G06K 9/4604 |
| 2017/0111581 A1* | 4/2017 | Muenzenmayer | G06T 3/4053 |
| 2018/0322632 A1* | 11/2018 | Barnes | G06T 7/11 |
| 2019/0384047 A1* | 12/2019 | Johnson | G06K 9/3233 |
| 2020/0075169 A1* | 3/2020 | Lau | G16B 25/10 |
| 2020/0211189 A1* | 7/2020 | Yip | G06T 7/0012 |

* cited by examiner

Fig. 1 - overall method

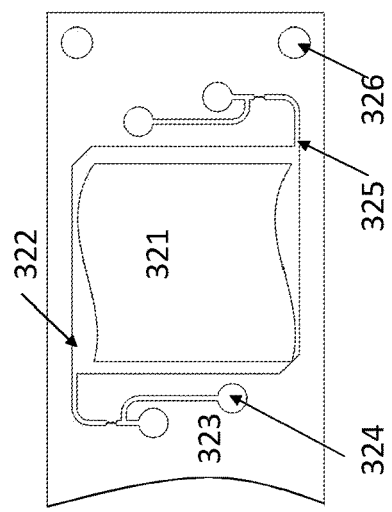
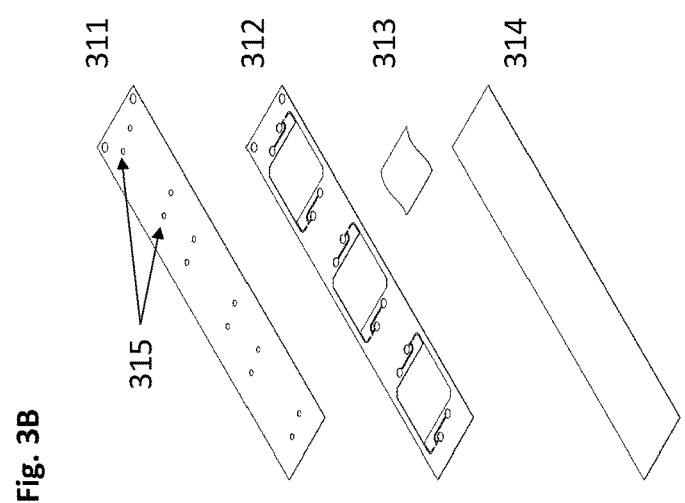
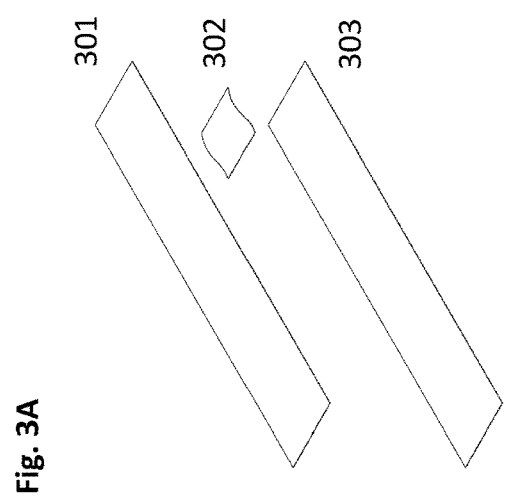

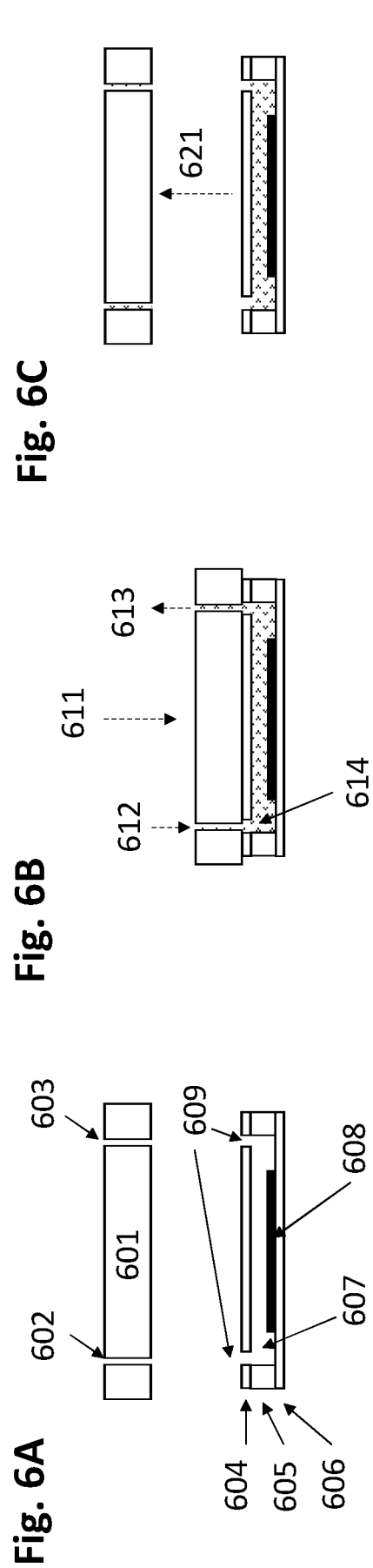

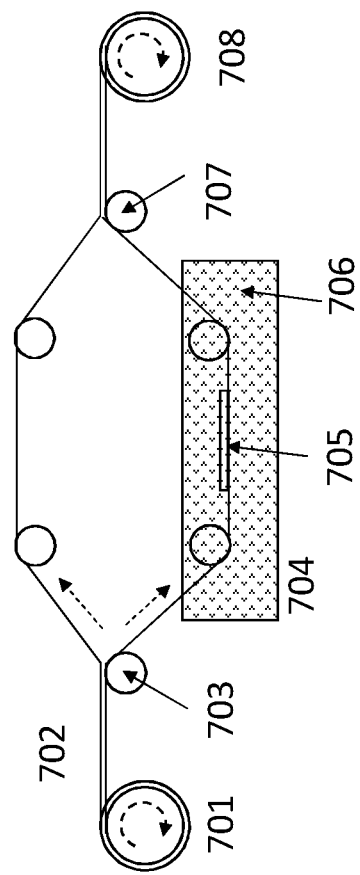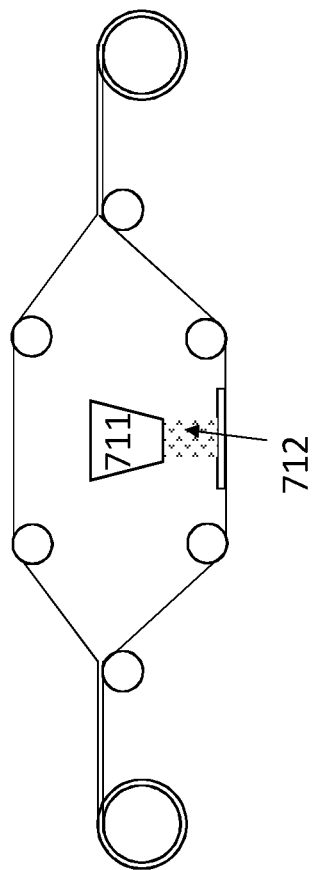
Fig. 7A
Fig. 7B

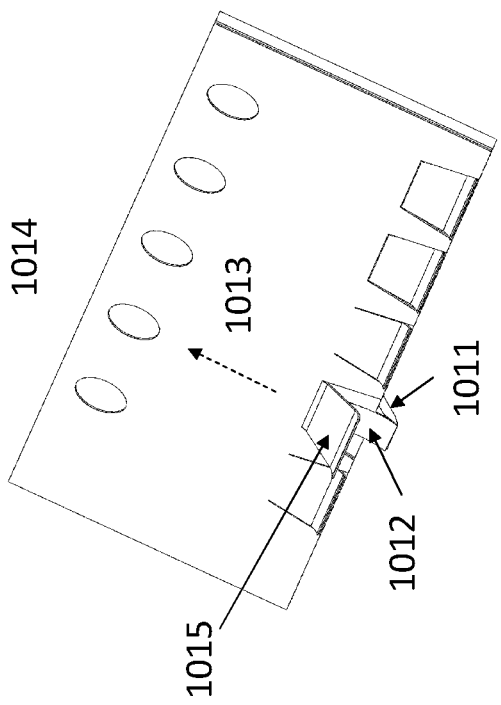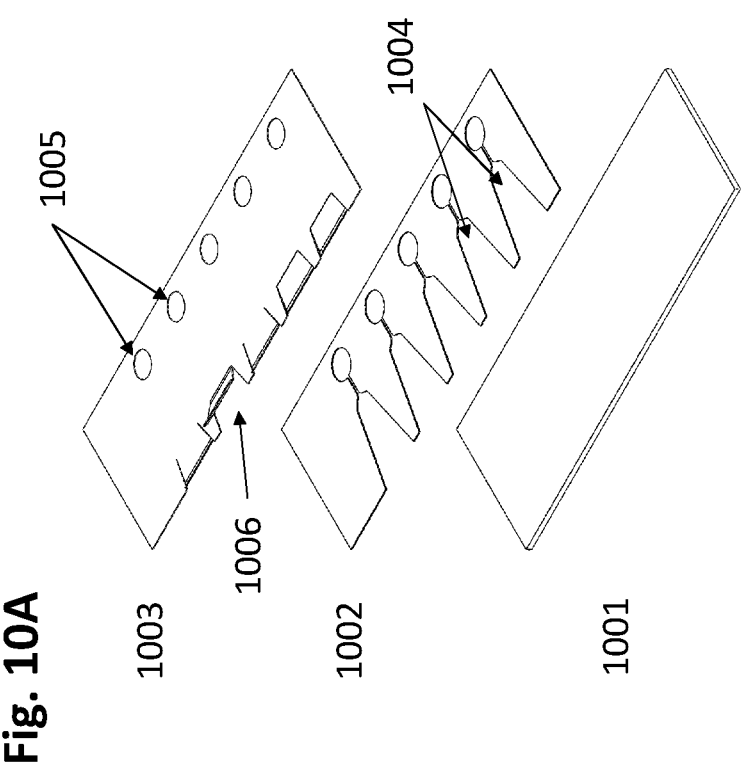

METHOD AND APPARATUS FOR REGISTERING IMAGES OF HISTOLOGICAL SECTIONS

CROSS-REFERENCE TO RELATED APPLICATIONS; BENEFIT CLAIMS

This application claims the benefit of Provisional Application No. 62/673,676, filed May 18, 2019, the entire contents of which is hereby incorporated by reference as if fully set forth herein, under 35 U.S.C. § 119(e).

TECHNOLOGY

The present invention relates generally to the slicing, staining, and imaging of biological tissues.

BACKGROUND

Recent advances in nucleic acid sequencing, gene transcription profiling, protein expression analysis, and super resolution microscopy offer great promise to understand the biology of tissues and organs at unprecedented single-cell detail. But while widely reported in carefully controlled biological systems, applying these methodologies to entire tissues and organs is difficult.

Slicing, staining, and imaging sections of tissue is a routine practice in medicine and biological research. But many single-cell techniques would be prohibitively slow and expensive if applied uniformly to each slice in a volume of tissue.

Practitioners typically generate and transfer thin tissue sections onto individual glass slides by hand. They then inspect individual slides and decide how to proceed with subsequent staining, microscopy, and analysis steps. These processes are labor-intensive and frequently damage tissue sections. Tools exist to automate many of these steps individually. But, unlike human practitioners, automation tools do not adapt each step to the unique traits of individual sections.

Because of this decision process, investigators typically make important diagnostic and scientific conclusions based on sections that represent only a small sampling of tissue. Furthermore, manual handling often disrupts the quality of sections and their spatial relationships with each other, hindering the three-dimensional representation of microscope images. Together, these issues significantly limit the understanding of the relationship between molecular and geometric features in tissue pathology.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIGS. 3A-C illustrate configurations by which a captured section is organized on its substrate, according to an embodiment of the invention;

FIGS. 6A-C illustrate an apparatus for staining sections, according to an embodiment of the invention;

FIGS. 7A-B illustrate another apparatus for staining sections, according to an embodiment of the invention;

FIGS. 10A-B illustrate a substrate configuration, according to an embodiment of the invention;

DESCRIPTION OF EXAMPLE EMBODIMENTS

Figure 1:
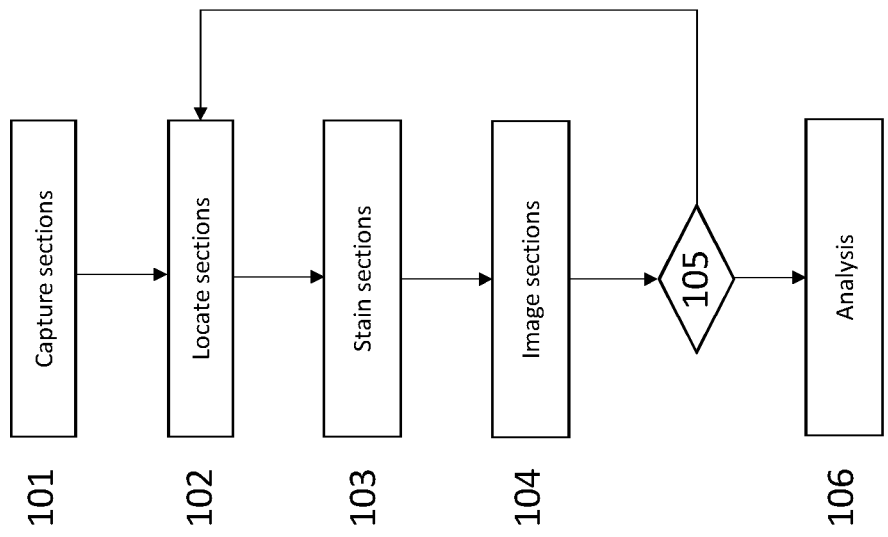
FIG. 1 illustrates a flow chart describing automating the staining and imaging of tissue sections, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. Functional Overview
   2.0. Registering Sections
   3.0. Example Applications
      3.1. Example Scenarios
   4.0. Implementation Mechanism—Hardware Overview
   5.0. Extensions and Alternatives 1.0 Functional Overview Recent advances in nucleic acid sequencing, gene transcription profiling, protein expression analysis, and super resolution microscopy offer great promise to understand the biology of tissues and organs at unprecedented single-cell detail. But while widely reported in carefully controlled biological systems, applying these methodologies to entire tissues and organs is difficult.

Using a microscope to study cross sections of biological tissue is fundamental to many research and clinical methods. It is often desirable to cut a series of sections from a block and digitally align their images, for example to overlay different staining channels or reconstruct structures in three dimensions. With modern digital cameras and software, such registration operations are straightforward for hundreds or more sections. But sectioning typically loses the alignment of serial sections because of rigid body errors (translation and rotation), stretching, tearing, and distortion.

Recent instrumentation innovations may dramatically reduce distortion in histological sectioning, including real-time imaging during the sectioning process (knife-edge scanning microscopy) and pre-adhering a film to capture sections (block face lamination array tomography). But it is typically desirable to further analyze sections after cutting, so this type of improvement does not automatically solve registration problems in subsequent steps such as staining sections. Manually registering digital images is possible, but enormously labor-intensive for all but the simplest applications. Software routines exist for registering serial sections without dedicated landmark features, but these are computationally expensive and prone to unpredictable errors even for simple rigid-body deformations. Both techniques implicitly identify and align features that can change quickly between sections in a series. Registration features at consistent locations in a section would make software reconstruction significantly more robust and efficient.

In an embodiment, an apparatus and method for writing registration features of tissue sections is provided.

Definitions:

"Block" refers to a volume of solid material to be analyzed, such as a region of biological tissue, manufactured synthetic tissue, or synthetic solid material. The entire block itself may represent a specimen for analysis, or the block may contain the specimen in an embedding medium.

"Face" refers to an exposed surface of the block, specifically a smooth face intended for sectioning with a knife.

"Section" refers to least one thin piece of the block produced by a cutting process.

"Positioner" refers to a mechanical element that supports and guides motion along a known path. A positioner may enable free motion or may include motors or actuators to cause motion along the known path in response to signals from a human operator or electronic controller.

"Staining" refers generally to one or more steps of chemical treatment intended to confer contrast on images of a section, such as by applying histologic stains, immunohistochemistry, or hybridization probes. It may also refer to processes related peripherally to these techniques, such as rinsing, blocking, releasing antigen, destaining, or preserving tissue, or to skipping a step entirely if so intended for individual sections. Staining visual contrast agents may include chromogenic, fluorescent, or mass spec probes.

"Imaging" refers to methods that provide visual information about a section, block, or collection thereof. Imaging includes but is not limited to: motion-capture photography, brightfield optical microscopy, fluorescence microscopy, electron microscopy, or focused-ion beam microscopy.

"Substrate" refers to a material with one or more faces that constrains the movement of a section. Substrates may be flexible, such as a polymer film, etc., or rigid, such as a glass slide, etc.

"Molecular analysis" refers to methods that reveal more information about the biological or chemical composition of a section, including, but not limited to: mass spectrometry, analytical chromatography, gel electrophoresis, Western blotting, immunoassays, flow cytometry, nucleic acid sequencing, nucleic acid hybridization, and related techniques. Molecular analysis also includes but is not limited to: means of conferring image contrast, including staining, etc., where the features of interest correspond to specific biological or chemical markers, such as fluorescence immunostaining and hybridization.

"Reagent" refers to liquids or gases that are necessary to perform cleaning, staining, molecular analysis, or other procedures pertinent to the preparation of biological material. Reagents include but are not limited to: air, nitrogen, water, buffers, staining solutions, organic solvents, blocking proteins, affinity probes such as antibodies, enzymes, mixtures or suspensions thereof.

"Registration" refers to the manipulation of two or more images in a way that accurately replicates a pre-existing spatial relationship, such as by aligning real features in two planes.

"Transformation" refers to an operation that deterministically alters the spatial distribution of image information.

2.0 Registering Sections

Figure 11:
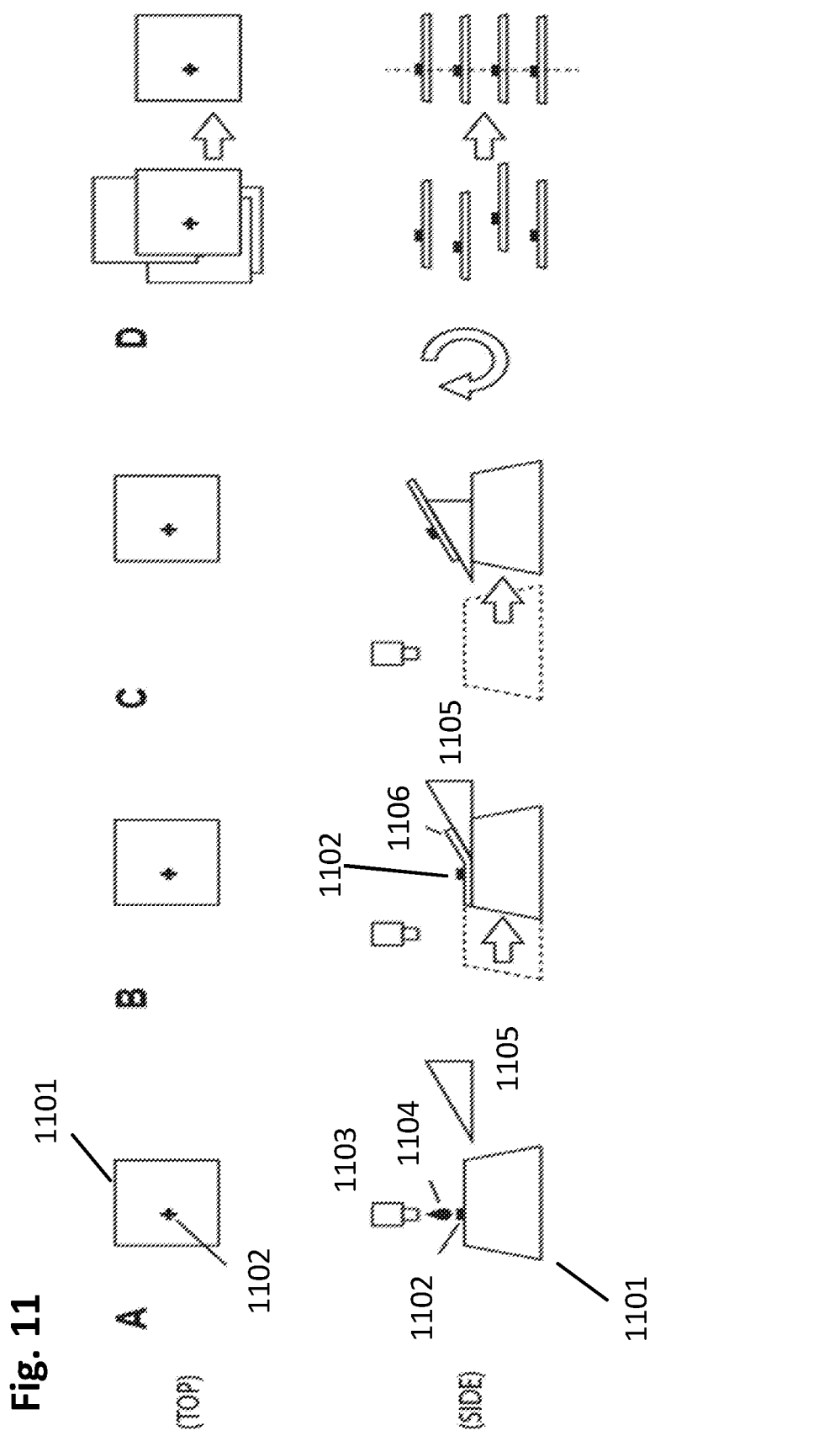
FIG. 11 illustrates a progression chart describing automating the staining and imaging of tissue sections, according to an embodiment of the invention.

Referring to FIG. 11, a method of writing registration features to sections and using the sections for subsequent registration operations is shown. In Step A, one or more registration features 1102 are physically applied to the exposed face of a block 1101 immediately before sectioning, for example, using an inkjet print head 1103, dye injector, die, roller, laser etcher, etc. In Step B, a knife 1105 cuts a fresh section 1106 from the block, which contains the registration features. In Step C, sections containing registration features are then collected and adhered to a substrate, either by manually applying to glass slides or by adhesion to a carrier film as discussed below. This process is repeated for a series of sections, which are then digitally imaged. In Step D, a computer or other instrument may be used to detect positions of the registration features and use the detected positions to transform each section's digital image and to achieve proper registration among the digital images of the sections.

The system is most valuable where sectioning instruments precisely control the block's position throughout a cutting cycle, for example where one or more axes are rigidly controlled by precision motion components and position feedback is measured by encoders or vision systems. This ensures that the position of registration features is consistent between sections in a series, and subject to minimal random variation.

Figure 12:
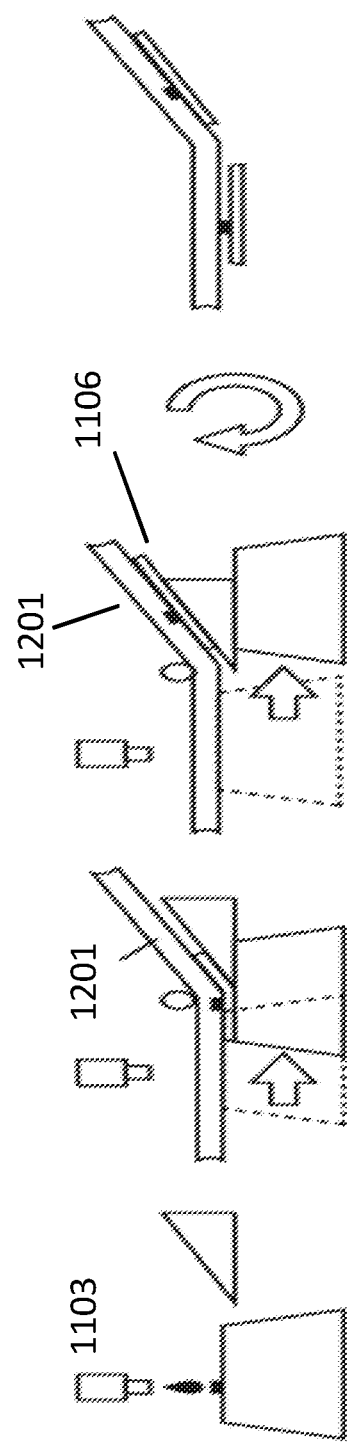
FIG. 12 illustrates a progression chart describing automating the staining and imaging of tissue sections, according to an embodiment of the invention.

In an embodiment, the exposed block face passes below an inkjet printing head 1103. The head 1103 prints 1104 alignment features 1102 such as lines, crosshairs, or reticles directly onto the face of specimen 1101. Referring to FIG. 12, a transparent capture tape 1201 adheres to the same face on the section 1106, thus encapsulating the registration features between the section and the tape and protecting the registration features against subsequent chemical preparations. This approach fixes the positions of registration features relative to structures in the specimen cross section, thereby allowing registration of their associated digital images irrespective of errors and deformations in the tape itself.

It is common to embed tissue in medium, such as paraffin or resin, prior to sectioning. Where paraffin is used, it is then common to remove paraffin from sections prior to subsequent staining and imaging steps. This dewaxing step typically involves heating and dissolving away paraffin in solvents, such as xylene and ethanol. Ink for printed registration features is therefore selected to be resistant to these solvents. But, where registration features are placed on paraffin, dewaxing dissolves this intermediate paraffin layer between the ink and tape, thereby causing ink to re-adhere in random locations or to fall away completely. In that situation, special measures are necessary to retain registration features on or near the captured section. In an embodiment, the adhesive face of the tape achieves this automatically: ink adheres permanently to the adhesive before paraffin dissolves away, essentially transferring the ink from the block face to the tape. An alternative strategy is to print ink on the tape itself, not the block face, shortly after tape is applied. This omits the intermediate paraffin layer, so that solvent-resistant ink remains on the tape after dewaxing.

In an embodiment, alternative techniques may be used to print alignment features onto the block face. A die may transfer liquid ink onto the surface, such that the shape of the die defines the shape of registration features or a roller may transfer dry ink via electrostatic adhesion for subsequent thermal fusion, as occurs in a laser printer.

In an embodiment, optical effects may be used to directly write alignment features onto the block face. A laser may engrave features directly onto the block face by way of material ablation or a laser may photoactivate the adhesion, curing, or other state change of an applied liquid resin, such as methyl methacrylate into polymethyl methacrylate, or of photoresist. Optical writing may more precisely define registration features compared to printing, where random errors in ink deposition and ink spreading may cause microscopic variations in the position of registration features. Printing and optical writing may also be combined, such as by first printing a coarse alignment mark, and then laser engraving fine features into the mark.

In an embodiment, the apparatus to apply alignment features may include liquid dosing components such as print heads, droplet nozzles, as well as wipers and rollers for cleaning up excess ink. The position of the print head, die, laser, or other writing apparatus is determined by one or more positioners, such as motor-driven ballscrew stages, piezo positioners, linear motors, etc. Positioning of the block, printing and writing components, and the precise profile of registration features may be coordinated by one or more digital controllers.

The position of registration features may be predetermined or determined during the sectioning process. For example, histological specimens usually do not completely fill the volume of their embedding blocks, so large blank regions of embedding medium are often present. It is valuable to position registration features in these blank regions, where they do not occlude tissue during imaging. Thus, images of early sections, or of the block face prior to sectioning, may be digitally analyzed to identify these blank regions, and registration features intentionally placed only there. This analysis may be performed by a computer or other instrument.

In an embodiment, image registration is typically performed during postprocessing on a computer, by digitally transforming individual images relative to a reference frame and saving these new images to storage. But the same technique may also be used to physically reposition the section relative to the imaging system. A computer algorithm could receive a first image containing alignment features and generate a transformation to align these features to known reference positions. Rather than virtually aligning images, however, motion controllers would then receive this transformation and physically adjust the position or rotation of either the substrate or imaging instrument.

Rigid body transformations, namely translation and rotation, are of primary interest for registering a series of digital images. A small number of simple registration features, such as two dots, are therefore theoretically sufficient for registering two images subject to rigid body effects. However, cutting and handling may further disrupt the relationship between serial sections, for example by stretching, curling, distorting or fracturing sections or their substrates. In this case, more complicated registration features, such as grids of lines or arrays, are beneficial to improve the recognition of errors and hence transformations for registration. Furthermore, many histological analyses consider information at highly magnified small regions of interest. Writing arrays of many alignment features onto each section would increase their coverage at high magnification, such that regions of interest each contain sufficient sets of features for registration to their counterparts in neighboring sections.

In addition to registration, features on block faces may serve other purposes. They may identify blocks, sections, or regions of interest, such as by including a unique text label, barcode, QR code, etc. These features may contain or reference metadata about the operating process, such as a timestamp, watermark, record of processing parameters, etc. They may also label sections or regions of interest to influence subsequent processes with, for example, by flagging specific sections for staining.

Features on block faces may also be used for positioning feedback, such as by applying repeating lines analogous to those in a linear encoder. An optical sensor could then detect the written features as position feedback when moving captured slices in subsequent operations. Features for identification and positioning could also be combined to serve as an absolute coordinate system along the length of a substrate containing many sections, for example, identification features define a coarse position index and positioning lines define a fine position index, etc.

Features on block faces may serve as focus targets for optical systems such as microscopes and machine vision cameras. A focus target of known shape and size can be used to quantify magnification, absolute scale, resolution, and optical aberrations in later imaging steps. This could help control quality by, for example, repeating imaging on regions with low quality, which is otherwise difficult when working with biological structures between multiple instruments. Imaging systems could also optically or digitally interpret the sharpness of focus targets for closed-loop feedback during imaging processes. In this case, a digital controller could actuate one or more focus axes to optimize the sharpness of focus targets in digital images, thereby optimizing bringing biological features in the same section into optimal focus.

The same features on block faces may serve combinations of the registration, identification, positioning, and focusing functions described previously.

Software Registration

As described herein, images of entire tissue sections are captured using a whole-section imaging microscope, whereby a motorized stage scans across the section and the microscope collects a grid of tiles. Tiles are then digitally stitched into a composite image. This process is repeated for a series of tissue sections to generate a "z-stack" of single-section images.

This whole-section process captures distinct boundaries of the tissue specimen, whether the specimen is a resected whole organ, gross dissection, or biopsy. Because the tissue boundary typically stands out predominantly from the embedding medium, it is a consistent and easily recognizable source of features for software registration.

Registration algorithms operate on two images at a time. In an embodiment, one section in a z-stack, typically the first, can be designated as a reference image that does not undergo transformation. The registration operations are iterated on pairs of images, transforming each subsequent image and using its predecessor as a reference.

Software registration algorithms may be feature-based: they first execute a feature-recognition step (such as SIFT, SURF, or ORB) on a first and second image, compare and sort features that are matches between the two sections, compute a transform that optimizes some distance metric between the matched features, then apply the transform to the first image.

Alternatively, software registration may be pixel-based, wherein the first image is iteratively transformed and compared to the second image via a similarity metric, until a similarity threshold is surpassed and iteration is halted.

Transforms may be rigid, affine, or higher order such as elastic and perspective. It is advantageous to restrict the degrees of freedom, the order, of a transform model to reduce computation time and the risk of nonconvergence or instability. In an embodiment, in cases where tape-based section capture precedes imaging, the order of the transform can be restricted to reflect only physically realistic deformations. This is typically two dimensional rigid, e.g., two axes of translation and one of rotation. An alternative transform is two-dimensional rigid body plus a single axis of elastic deformation that corresponds to longitudinal tape stretch, omitting the second, less severe transverse stretch dimension. Alternatively, two-dimensional rigid body and two-dimensional elastic stretch can be used. Finally, adding degrees of freedom to represent out-of-plane curvature would be advantageous in some scenarios, e.g., where images are captured inline during sectioning and are unsupported by a flat base such as a microscope stage.

Feature-based registration often sorts and averages from a large set of feature matches. Most matches may be incorrect, but by sampling a large number of them, the average is often accurate and consistent. However, computing transforms from a large number of features may be slow and subject to an accuracy limit imposed by statistical variation. In cases where registration is of tissue sections captured with a tape process, prior information about the realistic range of registration inaccuracies may inform the sorting of feature matches, improving algorithm performance. For example, the mechanics of tape capture may limit the possible translational error to a known range, so the algorithm could ignore or penalize feature matches that exceed a pixel distance that corresponds to this range. Similarly, the angular component of rigid-body deformation may only vary across a small range within the physical constraints of the capture system, so the algorithm could ignore matches that exceed this angular limit. Combining prior information from the sectioning process, the main source of registration error, could therefore improve registration accuracy, robustness, and speed.

Software registration may combine feature- and pixel-base approaches to improve accuracy, robustness, and speed. For example, a feature-based step may generate a first, low-order (e.g., rigid, etc.) transform, then a second pixel-based step may refine the final transform.

Registration Performance Metrics

In an embodiment, the performance of image registration can be validated using metrics derived from analytical or geometric analyses. These include measures of object boundaries in registration, such as image difference, intersection over union, and Dice coefficient, that mostly ignore pixel data within the object. Alternatively, Relative Target Registration Error (rTRE) may be used which represents geometric accuracy between the target and warped landmarks. Or registration metrics may derive directly from image pairs' pixel data, such as by image difference or cross-correlation.

Registration protocols may use fiducial markers that occur naturally in tissue, such as cross sections of vasculature. Alternatively, fiducial markers may be physically written on the specimen by any of the methods discussed herein. In these cases, rTRE may be used as the validation metric for evaluating performance of registration in a neighborhood around each fiducial marker.

In an embodiment, registration performance metrics may be selected based on the availability and type of ground truth data, such as manually annotated absolute positions in a series of images. We also select them based on execution time. For example, certain feature-based algorithms such as B-Spline registration can be computationally expensive. Geometrical and analytical analyses may be combined to balance accuracy and execution time for specific applications.

Performance metrics may be combined, or applied only to specific regions of interest. For example, registration metrics may be employed to optimize transforms to track individual structures through the image stack. They may also be used to evaluate and track tissue boundaries and gross anatomy.

Registration metrics may be used internally in a software registration method, such as by iteratively varying digital transforms and computing the resulting metrics, halting when the registration metric surpasses a known threshold. They may similarly be used where the transform is physical, such as the position of a motorized stage. Furthermore, registration metrics may be used to control or interrupt physical processes during the capture or imaging of tissue sections. For example, a computer may pause a physical sectioning process when a registration metric of inline imagery falls below a threshold, signaling that a sectioning problem has occurred.

Unique Challenges of Large-Scale Image Registration

Figure 13:
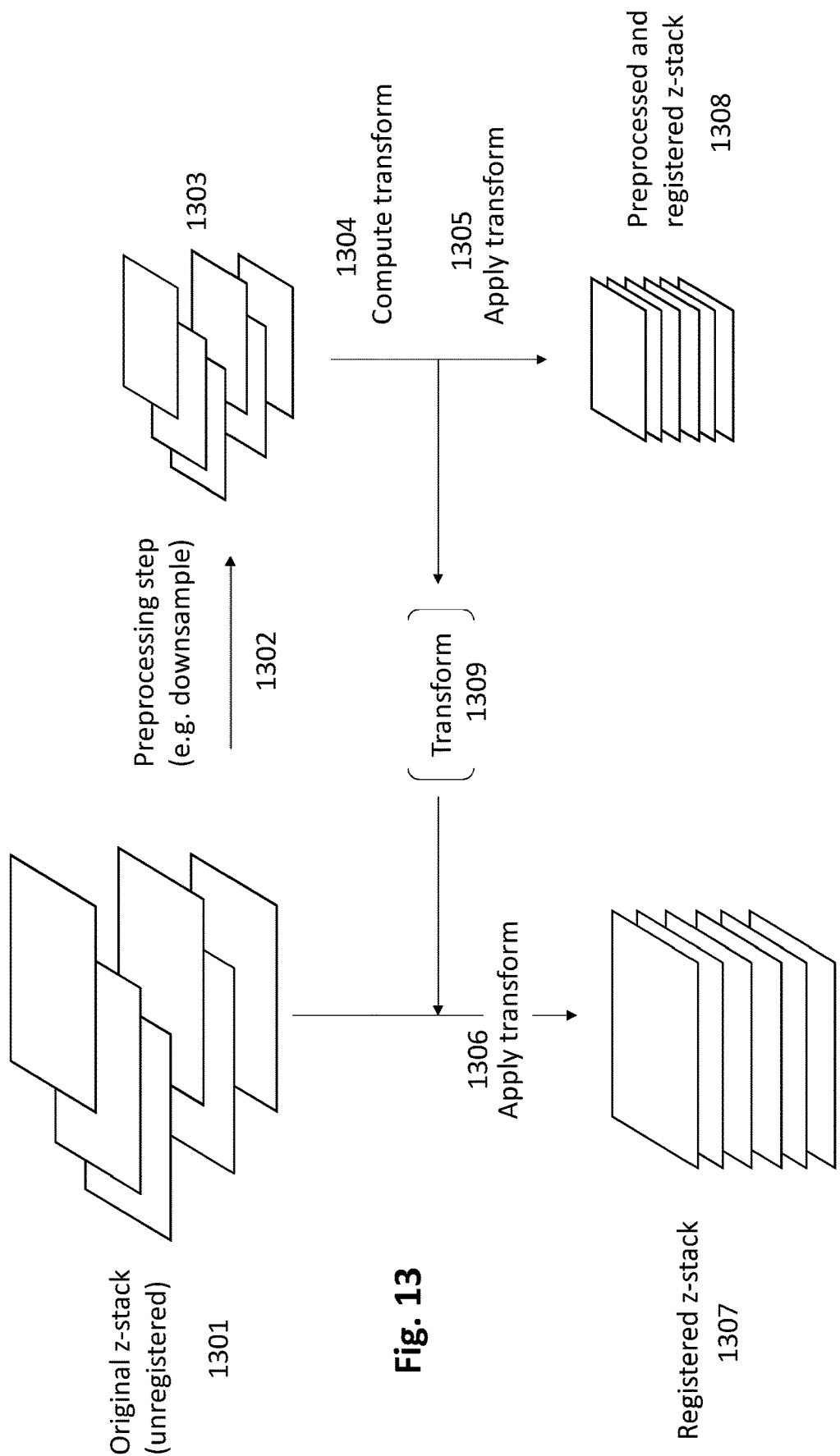
FIG. 13 illustrates a flow chart describing computing transforms that register preprocessed images, according to an embodiment of the invention.

Referring to FIG. 13, whole-section images of serial sections can be large datasets, with individual two-dimensional images approaching one billion pixels, and complete z-stack datasets of ten terabytes or more. Whereas, many image processing and analysis routines can be performed by subdividing large images into much smaller tiles, registration often cannot. This is because algorithmic registration often relies on features and patterns that are emergent only in the whole-section image, such as the tissue boundary or gross anatomical features such as arteries. But physical computer memory, the array indexing space of languages and computing environments, and computation time may all limit the ability to register full-resolution images.

In an embodiment, large datasets are registered by first shrinking the dataset (e.g., by downsampling, binarizing, masking, etc.), registering the shrunken dataset, then applying the registration function to the full dataset. Generally, one or more preprocessing routines 1302 are applied to the original imagery 1301, and one of the aforementioned registration methods is applied to compute transforms 1304 that produce registered preprocessed images 1308 by applying the transform 1305 to the preprocessed images 1303. Then the resultant transform 1309 is applied 1306 to the original imagery 1301, which has not been preprocessed, resulting in the registration of the original images 1307.

In an embodiment, the pre-processing step 1302 downsamples the original images 1301 by an inverse scale factor of two or more. The transformation matrices can be computed 1304 that are needed to register the downsampled images 1303, then the transforms are scaled and applied 1306 to the full-resolution original images 1301. Downsampled imagery 1303 may be obtained by scaling down a full-resolution image 1301 with matrix operations or by accessing lower-level image pyramid data that the microscope automatically generates during the acquisition process. Downsampled imagery 1303 typically still preserves tissue boundaries and gross anatomy, so the same key features are obtained but with much smaller matrices than full-resolution images. Additionally, downsampled images 1303 remove detail that ORB or other feature recognition steps may preferentially identify, focusing recognition and matching steps on higher quality features, potentially improving accuracy and robustness.

The resulting rigid-body or other low-order transformation matrix 1304 is typically appropriate for transforming the full-resolution image 1301 with only a nominal scaling adjustment 1309: because the matrix averages the effects of many features, its precision exceeds that of a single pixel. The full resolution image's registration error is not necessarily dependent on scale factor. Even if it were, however, the error would be tolerable for many applications.

Furthermore, the system may first coarsely register with a highly downsampled image, transform the corresponding source image (or one that is less downsampled), then apply a second fine registration step. In this case, the first registration step is fast and improves the performance of the second registration step.

In addition to downsampling, other preprocessing steps may precede registration. The full-resolution or downsampled imagery may be binarized with a thresholding operation that highlights only tissue boundaries and gross anatomy. Registration then proceeds with a much smaller data set that omits most features that would distract feature matching.

Alternatively, preprocessing may comprise masking images for only highly consequential or highly ordered histology. For example, tissue specimens often exhibit heterogenous tissue architecture, such as a disordered region of cancer in otherwise highly ordered stromal tissue. Masking the image set to include only the stromal tissue would improve the performance of the registration step, as features in stromal but not cancerous regions would more likely correlate between adjacent sections.

Alternatively, preprocessing may comprise masking images for only the tissue boundary or gross anatomy. These large-scale features can readily and consistently be isolated into masks by thresholding or adaptive binarization. To generate a final mask for registration, the difference would be measured of two other masks: one dilated, the other eroded from the original mask. This essentially traces a stripe around the tissue boundary or gross anatomy, substantially reducing the effective image size and biasing registration toward highly consistent features.

Hybrid approaches that combine written registration features and software registration There may be applications where software-only registration falls short. These include multistain panels, specimens that lack sharp tissue boundaries, and high-magnification imagery where tissue boundaries are cropped out to save memory. In these and other scenarios, a hybrid approach may be valuable. This comprises physically writing registration features on the tissue block (as originally disclosed) and then using software algorithms to recognize these physical marks as features for digital registration.

In this hybrid approach, the software algorithm may be tuned to predominantly recognize the written physical registration marks, such as by making the marks a distinct color and digitally deconvolving this color, or by making them a distinct shape and filtering the output of the feature recognition step for this shape. Alternatively, the software algorithm may recognize both written and innate features in the tissue to improve accuracy, robustness, or speed of computation.

Software registration is particularly weak in multistain panels. In this scenario, although two images represent two adjacent and hence highly similar cross sections of tissue, differences in how they are stained intentionally highlight very different features. There are therefore few features or pixel patterns that correlate between sections, and purely algorithmic means of image registration may not perform well. To solve these, physical registration marks can be written using any of the methods described herein. The appearance of the marks would not vary appreciably with the staining method, so they would be consistent between differently stained sections.

Software registration algorithms may also generate a transform that then inform the physical transformation of the sample, e.g. on a motorized stage, etc.

3.0 Example applications

The examples below refer to techniques that can be used in conjunction with the embodiments for writing registration features to sections described above. Referring to FIG. 1, a sequence of steps for automating the staining, and imaging of tissue sections in an embodiment is illustrated. In a first step 101, sections of a previously prepared block are captured onto a substrate. After capturing a series of sections, individual sections are then located on the substrate 102, stained 103, and imaged 104. Optionally, a decision process 105 may prescribe repeating the location, staining, and imaging steps under the same or different conditions, such that each section may be uniquely prepared. When complete, a section or series of sections may be reserved for additional analysis steps.

The decision process 105 may be an interface to a human operator, a computational algorithm, or a hybrid of the two. The process may be informed by images of one or more stains, predetermined settings such as provided by a human operator, sensors and controls from machinery used to automate these steps, or a combination of these. It may prescribe repeating staining and imaging steps so as to improve these steps' yield or quality. Alternatively, it may apply different staining or imaging steps, for example to alter feature identification, contrast, or magnification in microscope steps. The decision process may additionally use the image, sensor, and other information to identify sections for analysis independent of its function to repeat staining and imaging steps. In this way, the decision process serves as a filter that sorts sections based on suitability for one or more subsequent steps, including molecular analysis, destruction, and archiving.

Figure 2:
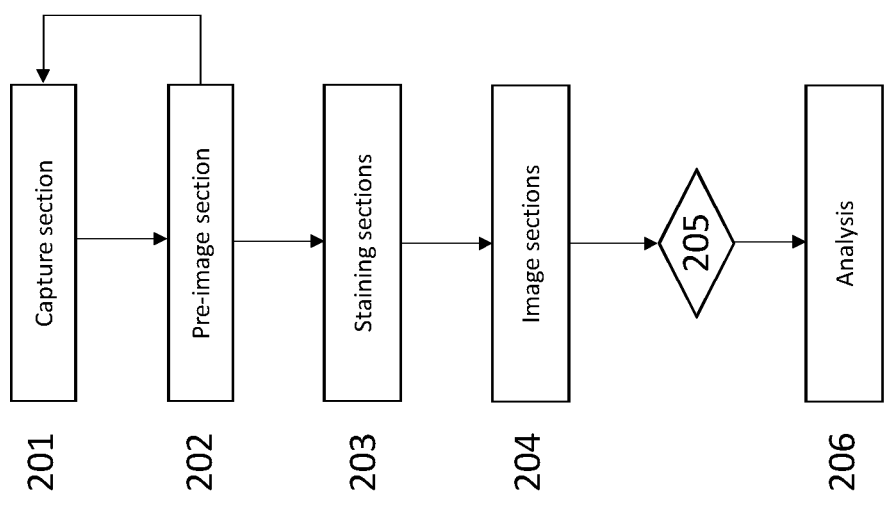
FIG. 2 illustrates a flow chart describing automating the staining and imaging of tissue sections having a pre-imaging section, according to an embodiment of the invention.

FIG. 2 illustrates an embodiment having a pre-imaging section. The method starts with a repeating process comprising section capture (201) and pre-imaging (202) steps. Data from the pre-imaging step inform subsequent staining (203) and imaging (204) steps. As in the method of FIG. 1, a decision process (205) identifies sections for molecular analysis. For example, data from the pre-imaging step may be used to identify different types of tissue morphology in different sections. The staining step may then apply different staining protocols according to these types of tissue morphology. Or the imaging step may occur at different magnification levels depending on tissue morphology type.

Alternatively, parameters of the sectioning process, such as slicing speed and thickness, may incorporate information from the pre-imaging step.

Further embodiments may incorporate elements of the method of both FIG. 1 and FIG. 2, for example, by carrying out staining, imaging, and analysis steps based on information from both pre-imaging and main imaging steps.

In an embodiment, the methods of FIG. 1 and FIG. 2 are carried out by computer control. Positioners move components in the capture step, and transport sections between steps. Each positioner receives a signal from a driver and controller, which receive their signals from a central computer or cluster of computers. Similarly, valves and sensors for other aspects of method automation also connect, optionally via drivers and controllers, to a computer or cluster. The imaging and pre-imaging steps are implemented with one or more digital cameras. The computer or cluster apply algorithms to analyze the data from these digital cameras and use the outcome of these algorithms to direct subsequent staining, imaging, and analysis steps.

FIGS. 3A-C illustrate configurations by which a captured section is organized on its substrate. They may represent a repeating unit of each component, such that the method of the invention uses many such repeating units in series.

FIG. 3A illustrates a substrate, comprising a film assembly that protects one or more captured sections in sequence. In coordination with the process of cutting a block, a capture film (303) adheres to the section (302). Following this, a protective film (301) adheres to the assembled capture film and section. The adhesion between these two pairs of films may further comprise a fluid seal that blocks or otherwise regulates the transport of fluids to the capture section.

In an embodiment, the substrate is a tape comprising one or more layers, one face of which is an exposed adhesive. In this embodiment, the slicing instrument first adheres the film's adhesive face to the exposed tissue face, activating adhesion by methods including but not limited to: applying pressure, applying heat, illuminating the adhesive with ultraviolet light, and combinations of these. Suitable tapes include but are not limited to: acrylic adhesives on polyvinyl chloride carrier films (such as 3M Scotch 600), silicone or acrylic transfer adhesives laminated to polyester terephthalate carriers, or chemical-resistant tapes coated with silicone adhesive (DuPont Kapton and Teflon FEP tapes).

In an alternative embodiment, the substrate attaches to the exposed tissue face by chemical means other than conventional adhesives films. The substrate may be pretreated with non-adhesive films that encourage its adhesion to the tissue, including waxes, acrylic polymer resins, liquid lubricant films such as organic oils, silicone oils, hydrogels; as well as surfactants and other chemicals that promote adhesion. Adhesion may also be achieved by locally melting the tissue's embedding medium with applied heat, light, radiation, pressure, or combinations of these.

For example, the substrate may be first coated with a low melting-point paraffin wax, then placed in contact with the exposed face of the block. An adjacent heater then melts the wax coating, which when cooled creates adhesion between the substrate and the block.

In an alternative embodiment, adhesion may be achieved by means of electrostatic attraction or electroadhesion. The substrate may contain conductive or dielectric thin films that promote adhesion. The apparatus may use electrodes, static generators, corona discharge elements or other components to create conditions for electrostatic attraction. The apparatus may also include features to control humidity, particles, and ambient gases that create a favorable environment for electrostatic adhesion.

In an alternative embodiment, adhesion may be achieved by magnetism. The block, substrate, or both may include magnetic materials, such that magnetic attraction between the section and substrate promotes their adhesion. The apparatus may include additional components such as electromagnets, regulators, and shielding to assist in this method.

FIG. 3B illustrates an alternative film assembly that protects one or more captured sections in sequence. A port layer (311) seals against a spacer layer (312). The combination of port and spacer layers then seals against the capture layer (314), entrapping one or more sections (313). Once the assembly is sealed, fluidic access to captured sections then only possible via ports (315).

FIG. 3C illustrates in greater detail features in the spacer or other layers, whose purpose is to allow fluidic manipulation of captured sections. The section (321) occupies a chamber (322) defined by at least the spacer layer (312) of the film assembly. One or more networks of fluidic features (323), comprising at least one interconnect (324) and one channel (325), guide fluid flow between the ports (315) in the port layer (311) and the chamber. Alignment features (326), such as dowel holes or printed marks, may also be included for purposes of guiding parts of the film assembly during sealing or handling.

Figure 4B:
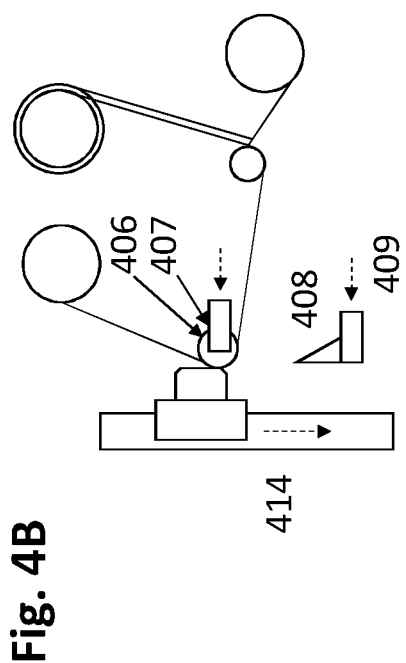
FIGS. 4A-H illustrate apparatuses that create and capture sections, according to an embodiment of the invention.
Figure 4D:
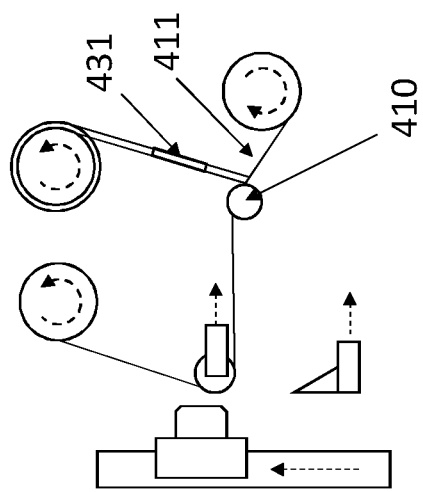
Figure 4A:
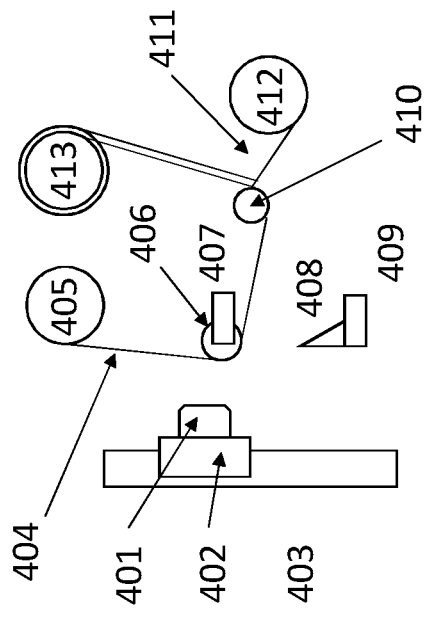

FIG. 4A describes an apparatus for the process of creating and capturing sections. The block (401) is attached to a positioner (402), in turn supported by a rigid base (403). A second positioner (407) supports an applicator (406), while a third slide (409) supports a knife (408). A first roll (405) couples to a shaft and releases the capture film (404). A second roll (412), also coupled to a shaft, deposits a protective film or films (411) that eventually attach to the capture film via a joining roller (410). These protective films may, for example, consist of the assembled microfluidic port (301) and spacer (302) layers of the assembly in FIG. 3A. A third roll (413), also attached to a shaft, is a take-up roll that collects the assembled films.

In an embodiment, the slicing instrument moves the block (401) past a sharp knife (408). Either the block (401) or knife (408) may be stationary, or both may move such that their relative motion determines the speed of slicing.

In an embodiment of the invention, positioners (402, 407, 409) each comprise a stationary guide, a moving platform, and a linear actuator. The linear actuators may be linear motors, rotary motors coupled to transmission screws, solenoids, voice coil actuators, or pneumatic pistons. Alternatively, the motion of one or more positioners may be nonlinear, such as rotary solenoids, or indirectly linked to an actuator, such as by a cam or linkage transmission. Two or more positioners may be combined, for example by using one positioner to move multiple components in the same direction, or in different directions by way of a multi-axis positioning stage.

Figure 4C:
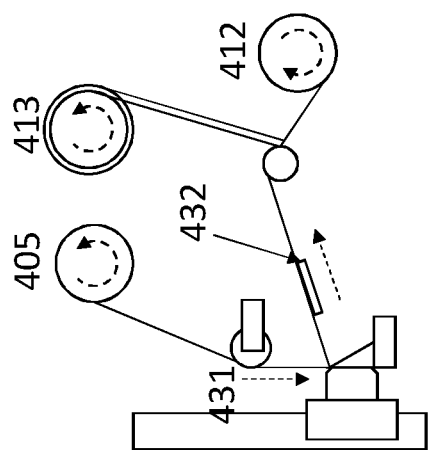

FIGS. 4B-D illustrate a sequence of motion phase that relate to the capture of sections onto the substrate film. Each phase comprises numerous steps, which for purposes of illustration appear simultaneously; however, steps may also progress in a different order than illustrated.

FIG. 4B illustrates the initial phase of a section capture cycle. The applicator (406) and knife (408) advance toward the tissue block (401) via their motion in their respective slides (407, 409). This places the applicator and hence capture film (404) close to the path of the of the face of the tissue block (401), such that the advancing motion of the tissue block (414) serves to adhere the capture film to specimen face.

FIG. 4C illustrates the adhesion and capture phase. Because the capture film is adhered to the specimen face, the motion (431) of the block pulls the capture film away from the applicator. When the knife contacts the block, it cuts beneath the specimen-film interface, such that the capture film liberates a section (432) from the block. Rotation of the three film rolls (405, 412, 413) move this section away from the knife and ultimately toward the joining roll (410).

FIG. 4D illustrates a final phase of the section capture process. Positioners (407, 409) return the applicator (406) and knife (408) to their initial positions. Separately, capture and protective films (411) assemble at the joining roller (410), enclosing the captured section (431) between them.

One or more electronic controllers may coordinate the movement of actuators necessary to carry out this sequence of steps, in an open-loop manner, or closed-loop with the help of encoders, speed, or position sensors. Rollers (405, 412, 413) may be attached to motors, clutches, brakes, gears, pulleys, or other power transmission components that enable coordinated motion between their axes of rotation.

Figure 4E:
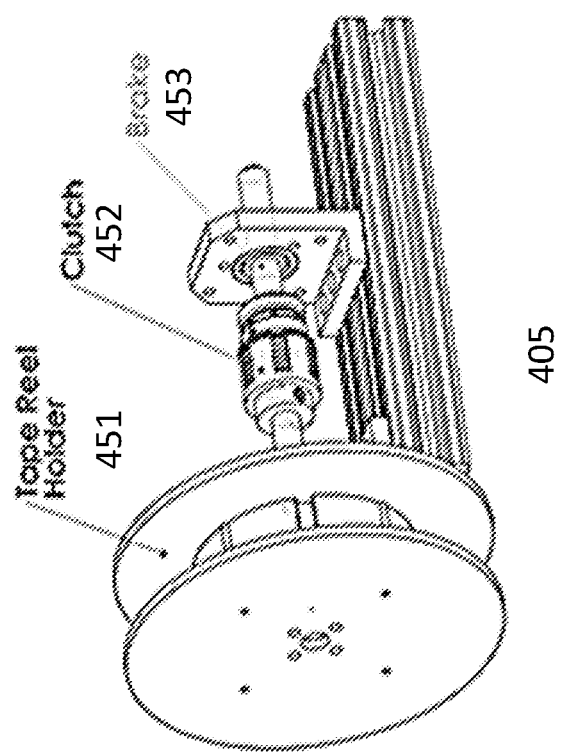

FIG. 4E illustrates a first roll (405) which may be called a feed roll. One or more feed rolls for dispensing tape may be used to enable the exchange of rolls. A feed roll (405) may comprise a tape reel holder (451) allowing exchange of rolls, a shaft and bearing allowing the feed of the tape or laminate, and a clutched brake (452, 453) to allow a specific drag torque to be set for the feed roll (450), thereby regulating the tension of the feed roll.

Figure 4F:
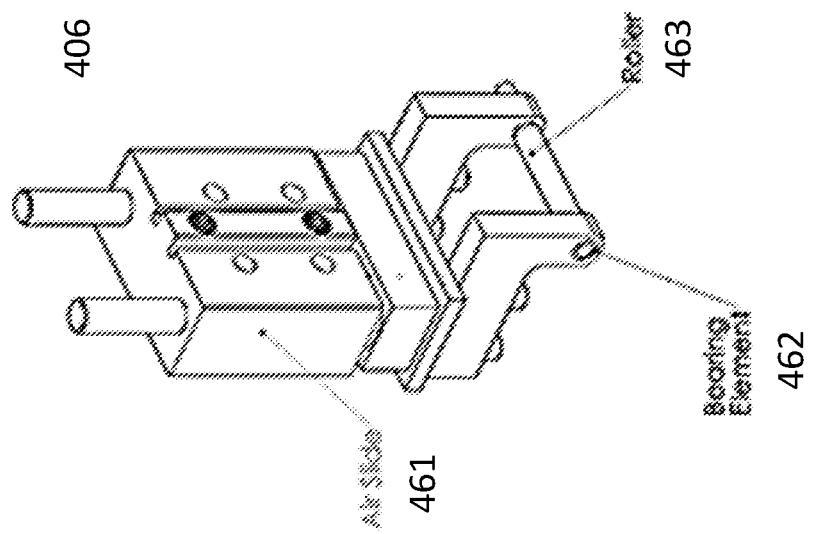

FIG. 4F illustrates an applicator (406). An applicator (406) may comprise a linear force spring such as an air piston, a linear slide (461), an applicator roller of a specific compliance (463), and a shaft on bearings (462) to allow free rolling of the applicator.

Figure 4G:
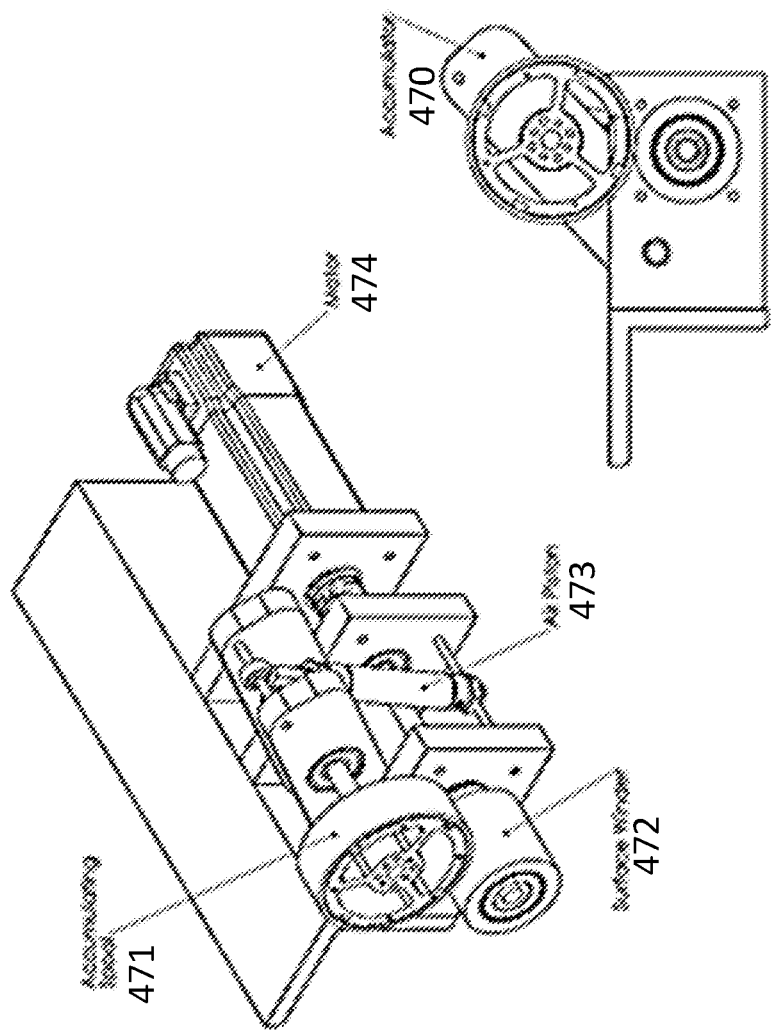

FIG. 4G illustrates a third roll (413) which may be called a surface winder. A surface winder (413) may comprise an assembly of an accumulating spool (471) on a rotary shaft, a surface winding roller (472) on a rotary shaft driven by a motor (474), a mechanism to allow the accumulating spool to grow in diameter on the surface winder (470), and a linear force preload mechanism such as an air piston (473). This assembly allows a variety of control schemes to be used to advance the tapeline, such as tension and position control, while ignoring effects of the changing diameter of the spool. Further, careful preload allows smooth winding and minimal section damage.

Figure 4H:
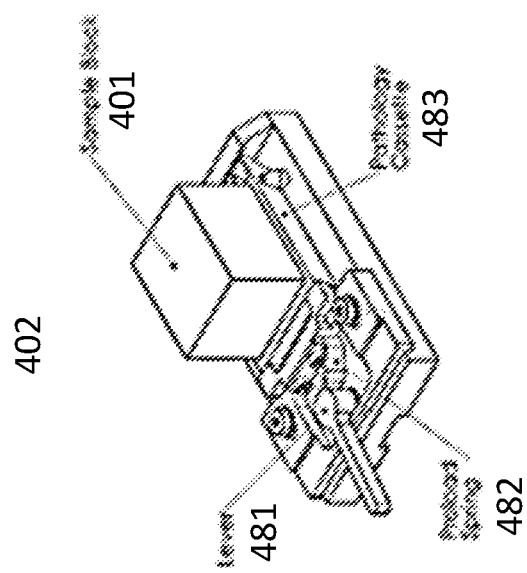

FIG. 4H illustrates a positioner (402) which may be called a sample block holder. A sample block holder (402) may comprise a small locking clamp capable of securing blocks mounted on pathology cassettes (483) or other standardized sample holders; a simple linear slide, a pre-load spring (482), and an actuating lever (481) may be used to load and unload samples.

Tape Assembly

Transparency, chemical compatibility, mechanical stability, and adhesion to paraffin are crucial properties of the capture film (404). Tapes that are too mechanically compliant, e.g. FEP tape, stretch during the sectioning process and make it difficult to use encoders for position feedback. Some tapes with silicone adhesive that feature high chemical stability, such as Kapton polyimide tapes, adhere well to paraffin but are strongly colored, hurting the ability to image in later steps. Polyester substrates perform well but generally do not laminate cleanly to silicone adhesives, leading to nonuniform adhesive coverage or overall poor adhesion to paraffin such as with CS Hyde clear polyester tape products. However, some polyester tapes do achieve uniform coverage of silicone adhesive that bonds strongly to paraffin, such as 3M 8911.

As captured sections are collected on the take-up roller, exposed adhesive can stick adjacent windings of tape to each other. This makes tape handling difficult and risks damaging captured sections and the tape itself. To prevent this, a protective film (411) is selected that comprises a transparent release liner treated with a non-silicone fluoropolymer coating on one face, such as 3M 5932. The liner's coated face is wound together with the capture film's adhesive face, which prevents tape self-adhesive and protects captured sections for subsequent steps. The liner is then removed prior to staining, using light mechanical tension or with a dedicated de-covering roller machine. The same length of protective film, or a new length of the same film type, may be re-wound with the capture film at any point in downstream processing to protect or preserve tissue.

Tape Routing and Active Slack Control

It is important to precisely control the direction and tension of tape on both sides of the laminated block face. If tension is too high or angle is too high relative to the block face, tape adhesion to the block face can destabilize. This may result in wrinkles, dangling sections, or skipped sections. If tension is too low or angle too low relative to the block face, the tape may accumulate excessive slack and stick to itself or components of the tape capture apparatus. Excessive slack may also accumulate in the tape shortly before it reaches the knife, which then fouls the knife and potentially severs the tape. As the laminated block face translates during the cutting cycle, ideal tape tension and angle generally change dynamically throughout the cycle.

One control strategy is to place one or more undriven rollers close to the knife edge to direct tape along a defined path. This reduces the angle at which the leading edge of the capture film travels immediately after being sliced, providing enough tension to keep the tape on the leading edge of the block from being cut, but not so much as to destabilize adhesion. Rollers comprise brass or plastic bushings on a stationary shaft, or cylindrical hubs on a shaft supported by bearings. Shafts may be supported by a machined or 3D printed mount that attaches to the same assembly that supports the knife, such that the same tape path is preserved relative to the knife as the overall knife position changes.

Another strategy is to create a small amount of slack in the take-up tape path, e.g., the length of tape that collects sections after cutting. This comprises an intentional delay or speed mismatch between the take-up roller's rotation relative to other tape rotational axes or the translation of the block itself. This is achieved, for example, by setting a virtual gear ratio between combinations of these axes in a computer motion control environment, such as Beckhoff TwinCAT, numerical control interfaces, etc. For example, the take-up spool axis and cutting are geared together so that the take-up axis moves slightly slower than the block moving axis, sustaining 5 mm or less of tape slack on the leading edge of the block face. Encoders on both the take-up spool axis, and slicing axis are used to provide position feedback, allowing the gear ratio to update for every slicing cycle.

Passive Slack and Tension Control

Because tension, direction, and slack change dynamically during the cutting cycle, constant tension can prematurely delaminate the tape from the block face. Active strategies such as computer numeric control are effective when properly tuned but may require frequent recalibration. Thus, passive mechanisms that achieve non-constant tape tension are desirable for sustained operation.

Orientating the slicing axis vertically is one way to passively control tape direction and tension. By laminating and capturing paraffin slices in a vertical motion, the gravity force on the tape itself is used to manage the leading edge slack instead of applied tension. In this scheme, a downward slicing motion introduces a slight amount of slack on the take-up end of the block that prevents tension-induced destabilization of adhesion.

Gravity-assisted passive slack control is more effective with an undriven dancer arm, comprising a pivot axis and a tape roller that rotates freely. The dancer arm is configured to rest gently on the take-up section of tape, and to use only its own weight to apply force to the tape, keeping slight tension in the system at all times. This ensures that the capture film does not stick to components of the apparatus. It also further simplifies the motor specifications, such that the take-up reel can simply use a motor that spins at constant velocity while a tunable inline clutch sets tape tension. The clutch normally slips except when the cutting stroke creates slack, providing control of section spacing and preventing excessive tension on the interface of adhesive and block face.

Furthermore, this scheme simplifies the control of tape at the start of the tape path. The tape supply reel can be implemented with only a tunable brake or clutch, keeping tension in the web without requiring a motor to constantly back drive the spool of tape. When properly tuned, the motion of the laminated block face overcomes the slight difference in tension between take-out and take-up paths: the take-out brake slips while the take-up clutch engages, but only until the resultant slack is collected on the take-up reel.

Applicator and Knife Assembly Design

An applicator assembly applies tape to the block face, moving back and forth each cycle to allow the block to return back to its starting position. The applicator may advance and retract by command from a computer controller, with optional feedback from a motor encoder. Where the tape capture apparatus mates with a standalone microtome, applicator actuation may also be timed based on the rotary position of the microtome's flywheel. This may be implemented with a numerical motion controller with rotary encoder feedback coupled to the flywheel, or by switches positioned at precise locations along the flywheel's path.

Embedding media and tissue are typically soft, so excessive application force combined with a hard applicator can damage tissue or propagate machinery vibrations into the block. An applicator roller with a soft sheath such at 35 A durometer silicone rubber is desirable, although other materials such as neoprene and hardnesses up to 60 A durometer may be beneficial in certain designs. A pneumatic piston applies a tunable application force of 15-130 N.

Positioning the application roller within 15 mm of the knife edge reduces the distance between captured slices, maximizing the number of samples that can be captured on a length of tape and hence increasing process throughput.

In certain embodiments, the slicing instrument of FIG. 4A is a microtome. In this embodiment, an operator may readily configure the microtome to include or exclude the apparatus of this invention. Such an apparatus is illustrated in FIGS. 9A-B. The apparatus contains attachment points to align with the specimen holder (901) of a microtome. In addition to the features of the instrument described in FIG. 4A, the instrument contains one or more rollers (911) that guide the tape path, and one or more tension control components (912). Alternatively, the slicing instruments may attach to a knife edge scanning microscope (KESM), or similar instrument that performs both sectioning and imaging functions.

Figure 9C:
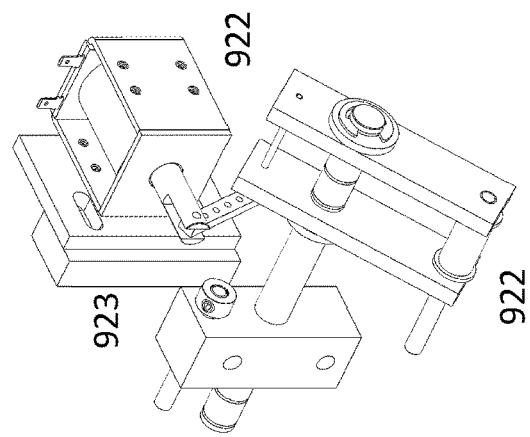
FIGS. 9A-C illustrate an apparatus using a microtome for staining sections, according to an embodiment of the invention.
Figure 9B:
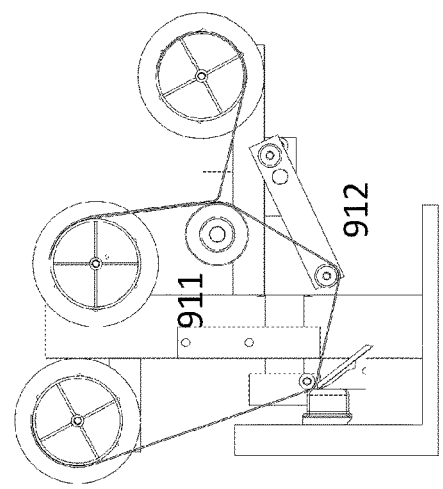
Figure 9A:
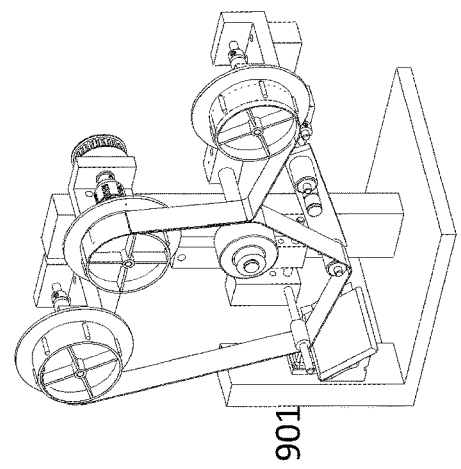

FIG. 9C provides additional detail on a critical component of the section capture system of FIG. 4A, which creates adhesion between the substrate and block. The substrate film wraps around a roller (922), where it contacts the block. A positioner (922) applies a force to the roller via one or more mounting components (923), such that the application force may be controlled. Application force may be varied by means of voltage, current, pulse cycle to electric actuators, or by pressure for pneumatic actuators, depending on the precise design of the positioner. The application force may be held constant for many cycles of sectioning or modulated in response to sensor signals. The applicator may also be retracted once per cycle, such that it does not interfere with backward motion of the block, by means of reversing the actuator's direction, or disengaging the actuator in the presence of a return spring.

Section Staining

Figure 5B:
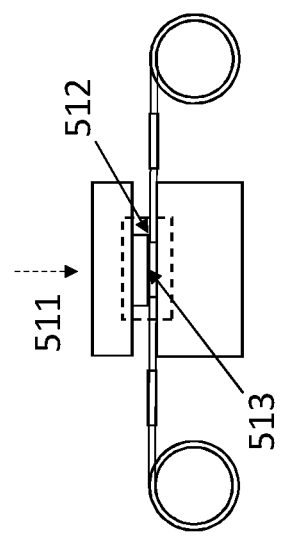
FIGS. 5A-D illustrate an apparatus for staining sections, according to an embodiment of the invention.
Figure 5D:
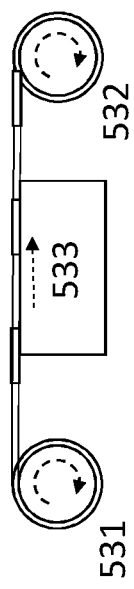
Figure 5A:
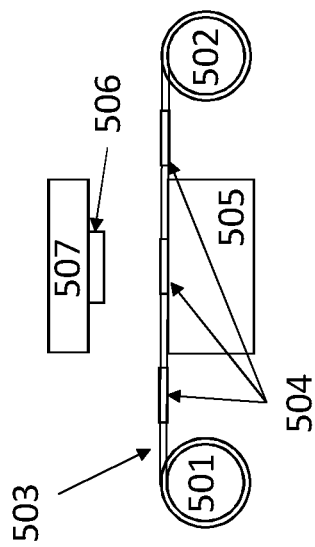

FIG. 5A illustrates an apparatus for staining sections. A roll (501), consisting of a substrate that is a film assembly (503) and captured sections (504), is transferred from an apparatus of section capture such as that described in FIG. 4A. A second roll (502) collects the same assembly as it progresses through processing. At least one fluidic manifold (507) moves relative to a stationary base (505). Each fluidic manifold contains at least one sealing region (506) and connections to separate fluid handling components (not pictured).

Figure 5C:
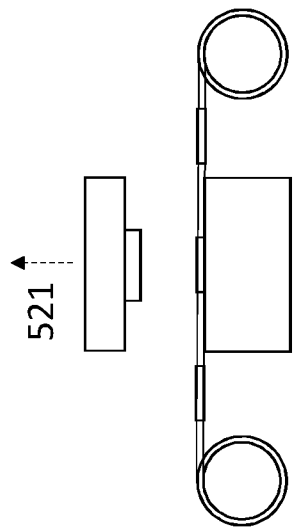

FIGS. 5B-D illustrate the sequence of staining sections using the apparatus of FIG. 5A, in the context of the film assembly described previously in FIGS. 3A-B. A positioner (not pictured) moves the manifold relative to the stationary base (511), such that the sealing region (506) forms a sealing interface with the film assembly's port layer (301) that coincides with a first section. Fluids flow in one or more steps between the manifold and film assembly via the sealing interface. When complete, the positioner separates the manifold, eliminating the sealing interface. Rolls (531, 532) then advance (533) to a next captured section, which may be immediately adjacent to the first section, or at another location along the length of the assembled film.

FIGS. 6A-C illustrate an apparatus for staining sections with additional details to the sealing interface and sequence of fluid flow in FIG. 5B-D. As in FIG. 3B-C, the film assembly comprises a port layer (604), spacer layer (605), capture film (606), and section (608) captured in a chamber (607). The manifold (601) contains at least one each of an inlet channel (602) and outlet channel (603), which align with corresponding ports (609) in the port layer. To perform a step of a staining process, the manifold advances (611) and seals against the port layer. Pumps or other flow control apparatus drive a reagent into the inlet channel or channels (612). The reagent then resides in the chamber (614) until a similar step removes it. Fluid, such as excess reagent, reagent from a prior step, or air, exits the outlet channel or channels (613). By separating the manifold and film assembly (621), the apparatus can be used to individually place each captured section in contact with a reagent for an arbitrary length of time.

FIG. 7A illustrates an alternative means of staining sections. A first roll (701), consisting of a substrate that is a film assembly (702) and captured sections (705), is ultimately directed to a second roll (708). Layers of the film assembly separate near a first roller (703) and ultimately reassemble at a second roller (707). One layer or set of layers submerges in a bath (704) containing reagent (706), such that staining steps are performed while the slice is submerged.

FIG. 7B illustrates a similar step, except that a nozzle (711) deposits the reagent (712) with the use of a bath. The nozzle may be a pipette, spray nozzle, inkjet head, or other device.

Section Imaging

Figure 8C:
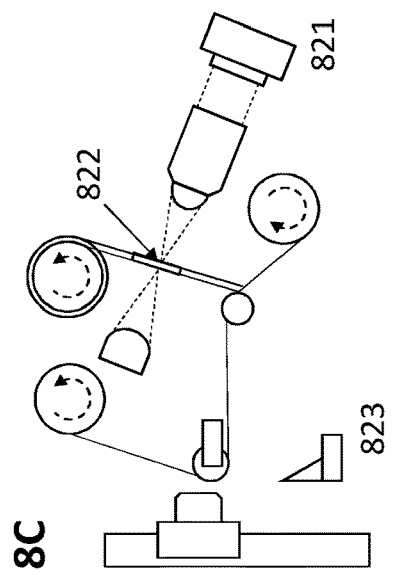
FIGS. 8A-C illustrate an imaging instrument, according to an embodiment of the invention.
Figure 8B:
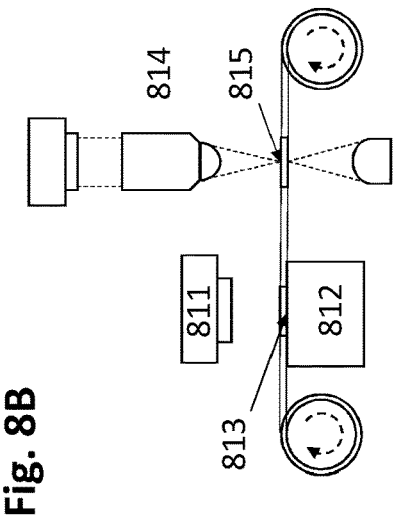
Figure 8A:
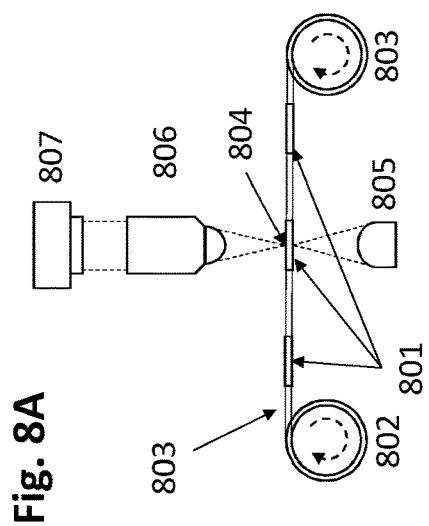

FIG. 8A illustrates an instrument for performing the imaging step of the method described in FIG. 1. Two rolls (802, 803) position the film assembly (803) containing one or more sections (801) into an imaging area (804). Imaging occurs on a dedicated microscope comprising one or more illumination sources (805), one or more lenses (806), a digital camera (807), and positioners to move sections into and out of the microscope's field of view (not pictured). The digital camera is connected, directly or indirectly, to a computer that carries out the decision process (105), such that the decision is based at least partially on output data of the microscope camera.

FIG. 8B illustrates a common apparatus for carrying out both staining and imaging steps. A fluid manifold (811) and base (812) carry out a staining step on one section (813), such as that described in FIGS. 5B-D and FIGS. 6A-C. A microscope (814), resembling that of FIG. 8A, carries out an imaging step on a second section (815). Alternatively, both the apparatus may perform both staining and imaging steps on the same section.

FIG. 8C, in an alternative embodiment, such as that described in FIG. 2, pre-imaging is synchronized with the handling of the substrate. The microscope (821) is attached to a section capture instrument (823), and oriented so as to image a region of the substrate (822) as it passes by.

In an embodiment of the microscope described in FIGS. 8A-C, the camera captures a sequence of two dimensional frames, comprising an entire section or a portion of a section. In an alternative embodiment, the camera scans a line perpendicular to film assembly's direction of travel. In other embodiments, the microscope may make use of alternative imaging modalities, illumination schemes, magnifications, and scanning geometries. For example, the camera may contain light sources and filters that enable switching between brightfield and fluorescent illumination.

One advantage of the method illustrated in FIG. 2 is the ability to use digital images from the pre-imaging step for subsequent processes. The in-line configuration of FIG. 8C, whereby a microscope images the captured sections as they pass on their substrate, is one possible approach to this pre-imaging step. In this case, the microscope may exhibit low magnification (0.25-1.0×) and wide field of view (more than 10 mm), such that a complete section may be represented in a single in-line image. The camera of the microscope may capture a continuous stream of the entire substrate as it passes, or one or more discrete frames for each section. In the latter case, frame capture may be triggered by signals from an optical sensor, position encoder, actuator drive loop, or the image content of previously captured frames.

These in-line images, saved on a local computer or networked storage volume, may then be recalled to select individual sections for the remaining steps of the method of FIG. 2. Alternatively, they may inform the interpretation of later high-magnification imaging steps, for example serving as initial guesses for stitching and 3d registration algorithms.

In-line images may also serve a quality control function for the sectioning apparatus of FIG. 4 or the staining apparatus of FIGS. 5 and 7. A computer algorithm would analyze the contents of one section's in-line images before issuing a signal to process the next section. This quality control function routine, for example, could issue a fault if image information reveals the substrate to be broken or misaligned. In the specific context of the sectioning apparatus, it could be used to fine-tune the speed and acceleration of cutting in response to feedback on sectioning quality of in-line images. Similarly, in the context of staining automation, in-line image feedback could be used to adjust the incubation time, mixing ratio, pressure, and temperature of reagents that interact with individual captured sections.

Substrate Variations

FIGS. 10A-B illustrates an alternative substrate configuration, whereby the substrate comprises base (1001), spacer (1002), and port (1003) layers. Features in the spacer layer define fluid channels (1004) that are accessible by openings in the port layer (1005). Channels are partially accessible to the outside environment via end ports (1006). When a channel is placed near the knife of a cutting apparatus (1011), suction is applied to its corresponding port hole (1014). When the knife cuts a section (1012), suction then draws this slice (1013) into fluid channel. The substrate may also include protruding features (1015) that promote the process of the slice entering the channel.

The base may be rigid, such as a glass slide, or may be a flexible assembly of plastic films. Alternative embodiments of the substrate in FIGS. 10A-B may include: adhesive faces that are fully or partially exposed, material surfaces that promote electrostatic attraction, or drag features to capture sections when propelled by an adjacent stream of gas or liquid.

In many sectioning applications, it is desirable to freeze blocks prior to sectioning. In such cases, the apparatus may operate at a low temperature, and room-temperature adhesion mechanisms may not be automatically suitable. To overcome this, the apparatus may preheat or chemically treat the surface of the block shortly prior to their mutual adhesion. Alternatively, a difference in temperature between two or more of the apparatus, substrate, and specimen may itself promote adhesion between the specimen block and substrate.

For example, the apparatus may inject a liquid, itself above its freezing point, between subfreezing surfaces of the substrate and specimen block shortly before lamination, such that the liquid freezes shortly upon contact. Alternatively, the apparatus may inject a gas that condenses into a liquid, and optionally freezes into a solid, upon contact with these cold surfaces. The condensed or frozen film may then provide temporary or permanent adhesion between the substrate and specimen block.

In certain embodiments, it may be advantageous to apply additional chemical treatment to the frozen section soon after it is captured. The method of the invention may include the application of a liquid-phase encapsulant shortly before or after assembly of the substrate's capture and cover layers.

In certain embodiments, the apparatus may include components and subsystems to regulate the temperature block and substrate, including but not limited to: chilling channels, refrigerated enclosures, Peltier cold plates, temperature sensors, thermostats, temperature regulators, and insulation materials.

Paraffin Melting

Some embedding media, namely paraffin, soften and eventually melt at temperatures as low as 42° C. While the bond between captured tissue and substrate generally remains permanent, it may be desirable to mitigate these temperature effects during the section handling process. This may be achieved by enclosing one or more of the apparatus of FIG. 4-9 in a cooled chamber. Alternatively, one or more of the rolls may be cooled directly, for example by placing the roll in thermal contact with a solid-state chiller or by circulating cooling fluid nearby.

Furthermore, paraffin sectioning quality is known to deteriorate slightly above room temperature. The machinery of this apparatus may locally surpass room temperature. Thus, these techniques may also be used for pre-cooling the block and substrate so as to improve quality.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

3.1 Example Scenarios

Cutting-Induced Section Distortion

When analyzing sectioned tissue, it is often beneficial to visualize multiple sections that are mutually aligned to each other. This allows pathologists and researchers to better understand the spatial relationships between histological features.

A common example is an immunohistochemistry (IHC) panel, whereby each section is stained for the expression of a specific marker. Information from aligned IHC sections is often more valuable than the that of individual sections on their own. For example, two distinct IHC markers may be present in a single cluster of cells, leading a pathologist to issue a diagnosis that would not be possible based on information from unaligned sections.

Typically, histology personnel cut sections by manually operating a microtome, floating them on a water bath, and transferring them to glass slides. While this technique is widely trusted, it nonetheless introduces many small mechanical distortions, such as tears and stretches. These distortions cumulatively move features at random at scales of micrometers and hinder the alignment of adjacent sections. Software compensation tools exist, but because each section may be subject to many such random distortions, they are limited in their capability.

Various strategies to automate the histology process still ultimately make use of a water bath, so these distortions similarly hinder alignment. Likewise, the embodiment illustrated in FIG. 10 that makes use of fluid channels has a possibility to introduce distortions that may make high-resolution alignment difficult.

An embodiment illustrated in FIG. 4A laminates a substrate to the exposed face of the tissue block prior to sectioning. The substrate is 10-100 times thicker than the section, making it much more rigid. This mechanically stabilizes the tissue during the cutting process, largely preventing tears. Likewise, stretching distortions are expected to decrease in magnitude and be limited to elastic deformations in the substrate. This benefit would be even more pronounced with a relatively inelastic substrate material, such as Mylar biaxially oriented polyester terephthalate.

Three-Dimensional Representation

Another case where it is beneficial to mutually align multiple sections is in the generation of 3D morphology models. Because this typically requires 100-10,000 slices, cutting-induced distortions would make this nearly impossible with manual sectioning. The established technique for generating 3d models of serial histological sections is knife-edge sectioning microscopy (KESM). This rapidly captures a digital image at the cutting edge of a ultramicrotome blade while sections are sliced from blocks, prior to the onset of most distortions.

But KESM introduces several problems. Tissue blocks need to be pre-stained, so alignment of sections with different marker-specific stains is not possible. It is not possible to remove paraffin or embedding medium before imaging, so these materials may introduce optical defects to images. Cutting and imaging rates must be synchronized, so that images frequently lack the light exposure that is needed for fluorescence and high magnification imaging. Sectioned tissue is discarded immediately after imaging. And practical limitations to the manufacture of knives and microscope components mean that the width of sections is limited.

Pre-laminating a substrate, such as described in this invention, circumvents all of these problems. This decouples the slicing and imaging steps of the method and allows the automation of staining and other preparative steps in between Imaging of captured sections may occur at the same wide range of exposures and magnifications available to slides prepared manually, but without the labor demands and section deformation. Using this technique, it is then possible to align many sections' images into a 3D model that has higher clarity, resolution, and stain specificity than KESM.

Substrate Clarity

Microscopes, such as those illustrated in FIG. 8, generally benefit from back illumination through their samples. Hence, it is desirable for all layers of the substrates of FIG. 3 to be optically transparent where the section is adhered. It is preferable for the capture film that laminates directly to block faces to be optically transparent, such as DuPont Teflon FEP, transparent PET, and 3M Scotch 600 tapes. Transparency in other layers is achieved by layering adhesive and non-adhesive films that are themselves transparent. Adhesives include silicone and acrylic transfer adhesives, such as 3M 91022 and 9474LE, respectively. Non-adhesive optically clear films include Mylar (PET) and other polyesters, polycarbonate, acrylic, Teflon FEP and PTFE, and cycloolefin polymers and copolymers.

High-Value Stains

Many analytical techniques, including IHC and molecular analysis, require reagents that are extremely expensive Immersing entire segments of substrates, as well as manually prepared slides, in baths of these reagents may be cost-prohibitive for a wide variety of applications. Flow chambers and partitions, for example plastic devices that clip onto slides, are commercially available for such histology applications. But applying these is labor-intensive, they are bulky, and their own material cost may be problematic when analyzing hundreds or thousands of sections.

The substrate design of FIGS. 3B-C mitigates this by defining a flow chamber for every captured section. The chamber geometry is cut into the substrate itself by die cutting or a similar low-cost mass-production technique, so material cost is substantially lower than slide-based devices. The apparatus of FIGS. 5-6 then flows high-cost reagents through these chambers with minimal wasted volume. This, combined with the advantages of automatically selecting only sections of interest for high-cost analysis, vastly improves the utility of such tissue-based techniques. Nonetheless, a staining automation approach that relies on entirely submerging segments of a substrate may be sensible for some applications, particularly common stains for which reagent cost is not a concern.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
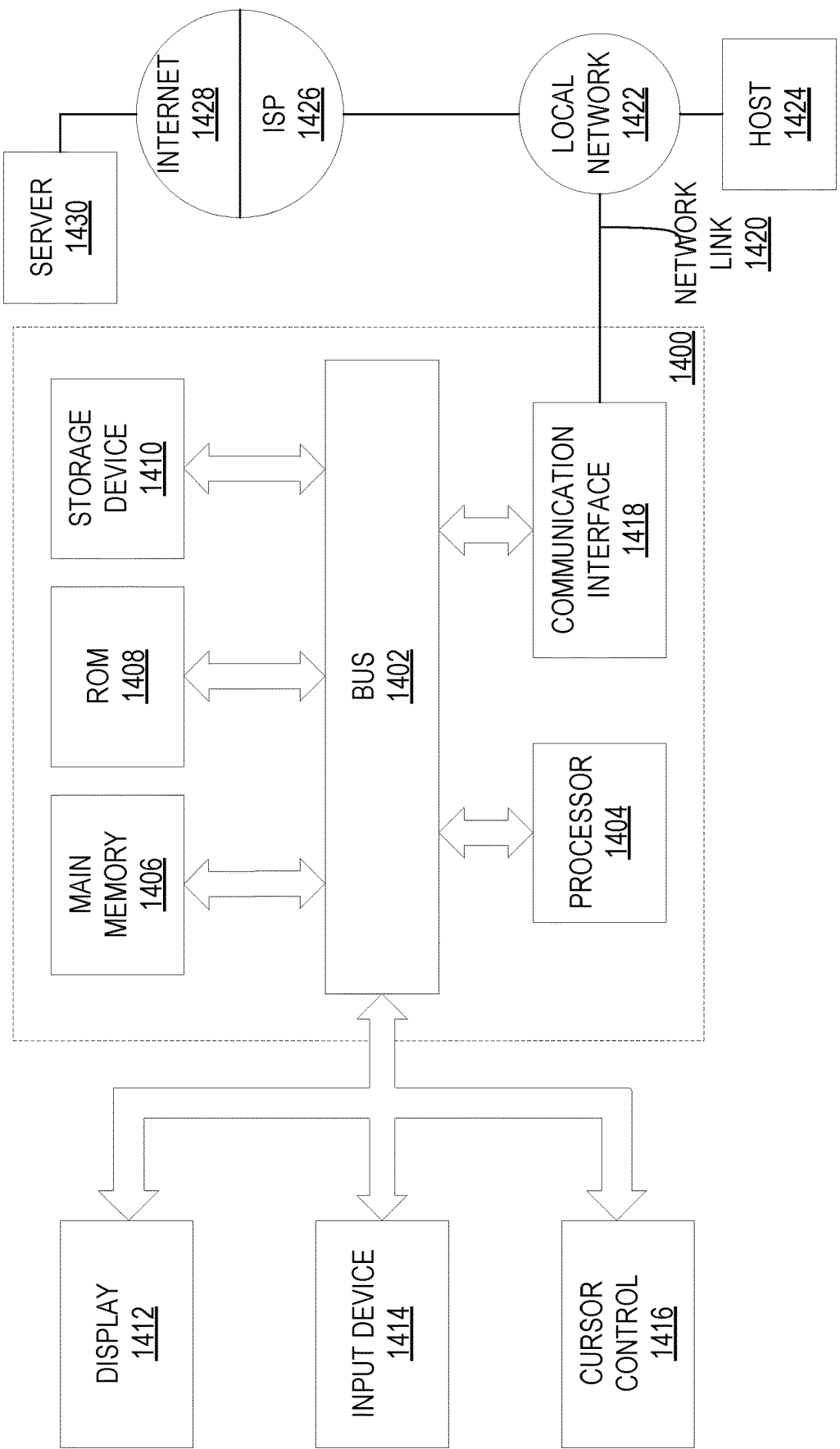
FIG. 14 illustrates an example hardware platform on which a computer or a computing device as described herein may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is device-specific to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a liquid crystal display (LCD), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using device-specific hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    digitally downsampling a set of full-resolution tissue section images to create a set of downsampled tissue section images;
    calculating one or more transform matrices that register the downsampled tissue section images;
    scaling the one or more transform matrices to apply to the set of full-resolution tissue section images; and
    registering the set of full-resolution tissue section images by applying the scaled one or more transform matrices to the set of full-resolution tissue section images.

2. The method of claim 1, wherein digitally downsampling the set of full-resolution tissue section images further comprises:
    binarizing the set of downsampled tissue section images with a thresholding operation that highlights tissue boundaries and gross anatomy.

3. The method of claim 1, wherein digitally downsampling the set of full-resolution tissue section images further comprises:
    downsampling the set of full-resolution tissue section images using matrix operations.

4. The method of claim 1, wherein digitally downsampling the set of full-resolution tissue section images further comprises:
    downsampling the set of full-resolution tissue section images using lower-level image pyramid data generated during an acquisition process.

5. The method of claim 1, wherein digitally downsampling the set of full-resolution tissue section images further comprises:
    downsampling the set of full-resolution tissue section images by an inverse scale factor of two or more.

6. The method of claim 1, wherein digitally downsampling the set of full-resolution tissue section images further comprises:
    masking the set of full-resolution tissue section images for only highly consequential or highly ordered histology.

7. The method of claim 1, wherein digitally downsampling the set of full-resolution tissue section images further comprises:
    masking the set of full-resolution tissue section images for only tissue boundary or gross anatomy.

8. One or more non-transitory computer-readable storage media, storing one or more sequences of instructions, which when executed by one or more processors cause performance of:
    digitally downsampling a set of full-resolution tissue section images to create a set of downsampled tissue section images;
    calculating one or more transform matrices that register the downsampled tissue section images;
    scaling the one or more transform matrices to apply to the set of full-resolution tissue section images; and
    registering the set of full-resolution tissue section images by applying the scaled one or more transform matrices to the set of full-resolution tissue section images.

9. The one or more non-transitory computer-readable storage media of claim 8, wherein digitally downsampling the set of full-resolution tissue section images further comprises:
    binarizing the set of downsampled tissue section images with a thresholding operation that highlights tissue boundaries and gross anatomy.

10. The one or more non-transitory computer-readable storage media of claim 8, wherein digitally downsampling the set of full-resolution tissue section images further comprises:
    downsampling the set of full-resolution tissue section images using matrix operations.

11. The one or more non-transitory computer-readable storage media of claim 8, wherein digitally downsampling the set of full-resolution tissue section images further comprises:
    downsampling the set of full-resolution tissue section images using lower-level image pyramid data generated during an acquisition process.

12. The one or more non-transitory computer-readable storage media of claim 8, wherein digitally downsampling the set of full-resolution tissue section images further comprises:

downsampling the set of full-resolution tissue section images by an inverse scale factor of two or more.

13. The one or more non-transitory computer-readable storage media of claim 8, wherein digitally downsampling the set of full-resolution tissue section images further comprises:

masking the set of full-resolution tissue section images for only highly consequential or highly ordered histology.

14. The one or more non-transitory computer-readable storage media of claim 8, wherein digitally downsampling the set of full-resolution tissue section images further comprises:

masking the set of full-resolution tissue section images for only tissue boundary or gross anatomy.

15. An apparatus, comprising:

one or more processors; and a memory storing instructions, which when executed by the one or more processors, causes the one or more processors to:

digitally downsample a set of full-resolution tissue section images to create a set of downsampled tissue section images;

calculate one or more transform matrices that register the downsampled tissue section images;

scale the one or more transform matrices to apply to the set of full-resolution tissue section images; and register the set of full-resolution tissue section images by applying the scaled one or more transform matrices to the set of full-resolution tissue section images.

16. The apparatus of claim 15, wherein digitally downsample the set of full-resolution tissue section images further comprises:

binarize the set of downsampled tissue section images with a thresholding operation that highlights tissue boundaries and gross anatomy.

17. The apparatus of claim 15, wherein digitally downsample the set of full-resolution tissue section images further comprises:

downsample the set of full-resolution tissue section images using matrix operations.

18. The apparatus of claim 15, wherein digitally downsample the set of full-resolution tissue section images further comprises:

downsample the set of full-resolution tissue section images using lower-level image pyramid data generated during an acquisition process.

19. The apparatus of claim 15, wherein digitally downsample the set of full-resolution tissue section images further comprises:

downsample the set of full-resolution tissue section images by an inverse scale factor of two or more.

20. The apparatus of claim 15, wherein digitally downsample the set of full-resolution tissue section images further comprises:

mask the set of full-resolution tissue section images for only highly consequential or highly ordered histology.

* * * * *